United States Patent
Baentsch et al.

(10) Patent No.: US 10,229,261 B2
(45) Date of Patent: *Mar. 12, 2019

(54) USER TRUSTED DEVICE FOR DETECTING A VIRTUALIZED ENVIRONMENT

(71) Applicant: International Business Machines Corporation, Armonk, NY (US)

(72) Inventors: Michael Baentsch, Gross (CH); Thomas Gschwind, Zurich (CH); Andreas Schade, Langnau am Albis (CH)

(73) Assignee: International Business Machines Corporation, Armonk, NY (US)

( * ) Notice: Subject to any disclaimer, the term of this patent is extended or adjusted under 35 U.S.C. 154(b) by 78 days.

This patent is subject to a terminal disclaimer.

(21) Appl. No.: 15/376,766

(22) Filed: Dec. 13, 2016

(65) Prior Publication Data

US 2018/0089414 A1 Mar. 29, 2018

Related U.S. Application Data

(63) Continuation of application No. 14/651,540, filed as application No. PCT/IB2013/060408 on Nov. 26, 2013, now Pat. No. 9,589,128.

(30) Foreign Application Priority Data

Dec. 14, 2012 (GB) .................................. 1222583.5

(51) Int. Cl.
*G06F 21/44* (2013.01)
*G06F 21/50* (2013.01)
(Continued)

(52) U.S. Cl.
CPC ............ *G06F 21/44* (2013.01); *G06F 9/4401* (2013.01); *G06F 9/4406* (2013.01); *G06F 21/50* (2013.01);
(Continued)

(58) Field of Classification Search
None
See application file for complete search history.

(56) References Cited

U.S. PATENT DOCUMENTS 7,743,422 B2 6/2010 Narayanaswami et al.
2005/0193189 A1 9/2005 Kim
(Continued)

FOREIGN PATENT DOCUMENTS

CN 101038551 A 9/2007
CN 101154256 A 4/2008
(Continued)

OTHER PUBLICATIONS

Quist, Danny, Val Smith, and Offensive Computing. "Detecting the presence of virtual machines using the local data table." Offensive Computing (2006). (Year: 2006).*

(Continued)

*Primary Examiner* — Madhuri R Herzog
(74) *Attorney, Agent, or Firm* — Peter J. Edwards

(57) ABSTRACT

A computer to boot from a user trusted device, the user trusted device comprising a connection interface enabling connection with said computer, the method comprising: enabling said computer to start booting from the user trusted device upon connection of the user trusted device with said computer via said connection interface; instructing a processor of the computer to execute virtualization sensitive code and issue completion data upon completion of execution, which completion data depends on the virtualization sensitive code and its execution by the processor; determining, based on said completion data, whether the execution was not performed in a virtualized environment; and enabling said computer to complete booting from the user trusted device upon determining that the execution was not performed in a virtualized environment. The invention is (Continued)

further directed to a user trusted device enabling this method and to related systems.

5 Claims, 2 Drawing Sheets

(51) Int. Cl.
     *G06F 21/51*           (2013.01)
     *G06F 21/56*           (2013.01)
     *G06F 21/57*           (2013.01)
     *G06F 9/455*           (2018.01)
     *G06F 9/4401*         (2018.01)

(52) U.S. Cl.
     CPC .............. *G06F 21/51* (2013.01); *G06F 21/57* (2013.01); *G06F 21/572* (2013.01); *G06F 21/575* (2013.01); *G06F 9/45533* (2013.01); *G06F 21/566* (2013.01)

(56) References Cited

U.S. PATENT DOCUMENTS

| | | |
|---|---|---|
| 2007/0011444 A1 | 1/2007 | Grobman et al. |
| 2007/0113227 A1 | 5/2007 | Oney et al. |
| 2008/0120499 A1 | 5/2008 | Zimmer et al. |
| 2008/0256536 A1 | 10/2008 | Zhao et al. |
| 2009/0070576 A1 | 3/2009 | Hocking et al. |
| 2011/0060947 A1 | 3/2011 | Song et al. |
| 2012/0011354 A1 | 1/2012 | Owen |
| 2012/0260345 A1 | 10/2012 | Quinn et al. |
| 2015/0317472 A1 | 11/2015 | Baentsch et al. |

FOREIGN PATENT DOCUMENTS

| | | |
|---|---|---|
| CN | 101334824 A | 12/2008 |
| CN | 102681859 A | 9/2012 |
| GB | 2508894 A | 6/2014 |
| WO | 2008140975 A1 | 11/2008 |
| WO | 2009064406 A1 | 5/2009 |
| WO | 2011031387 A1 | 3/2011 |
| WO | 2011145199 A1 | 11/2011 |
| WO | 2014091343 A1 | 6/2014 |

OTHER PUBLICATIONS

Ferrie, Peter. "Attacks on more virtual machine emulators." Symantec Technology Exchange 55 (2007). (Year: 2007).*

Issa, Anoirel. "Anti-virtual machines and emulations." Journal in Computer Virology 8.4 (2012): 141-149. (Year: 2012).*

Garfinkel, Tal, et al. "Compatibility Is Not Transparency: VMM Detection Myths and Realities." HotOS. 2007. (Year: 2007).*

T. Liston and E. Skoudis. On the Cutting Edge: Thwarting Virtual Machine Detection. http://handlers.sans.org/tliston/ThwartingVMDetection_Liston_Skoudis.pdf, Jul. 2006 (Year: 2006).*

Pék, Gábor, Boldizsár Bencsáth, and Levente Buttyán. "nEther: In-guest Detection of Out-of-the-guest Malware Analyzers." Proceedings of the Fourth European Workshop on System Security. ACM, 2011. (Year: 2011).*

Rutkowska, Joanna, and Alexander Tereshkin. "IsGameOver ( ) anyone." Black Hat, USA (2007). (Year: 2007).*

Baentsch et al., "User Trusted Device for Detecting a Virtualized Environment", U.S. Appl. No. 15/901,961, filed Feb. 22, 2018.

Weigold et al., "The Zurich Trusted Information Channel—An Efficient Defence Against Man-in-the-Middle and Malicious Software Attacks", Trust 2008, LNCS 4968, pp. 75-91, 2008. © Springer-Verlag Berlin Heidelberg 2008.

International Application No. PCT/IB2013/060408, Search Report and Written Opinion, dated May 16, 2014, 11 pages.

Paleari, Roberto, et al. "A fistful of red-pills: How to automatically generate procedures to detect CPU emulators." Proceedings of the USENIX Workshop on Offensive Technologies (WOOT). vol. 41. 2009, 7 pages.

Raffetseder, Thomas, Christopher Kruegel, and Engin Kirda. "Detecting system emulators." International Conference on Information Security. Springer Berlin Heidelberg, 2007, 18 pages.

Application No. GB1510657.8, Examination Report dated Jul. 8, 2015, 3 pages.

Fritsch, "Analysis and detection of virtualization-based rootkits", Bachelararbeit, Technische Universitaet, Muenchen, Aug. 27, 2008, http://www.mnm-team.org/pub/Fopras/frito8/PDF-Version/frit08.pdf, 49 pages.

Baentsch et al., "User Trusted Device for Detecting a Virtualized Environment", U.S. Appl. No. 15/376,790, filed Dec. 13, 2016.

* cited by examiner

USER TRUSTED DEVICE FOR DETECTING A VIRTUALIZED ENVIRONMENT

BACKGROUND

The invention relates in general to the field of user trusted devices enabling computers to boot therefrom, as well as related devices, systems and methods.

A technology is needed, which would allow software to be executed on any non-previously prepared or reviewed computer (e.g., an employee's private PCs) while ensuring that its execution is secure, e.g., as secure as on a corporate/company PC. Such a technology would enable a trusted "bring your own" (BYO) computing work environment. BYO generally relates to "Bring your own device" (BYOD), "bring your own technology" (BYOT), or closely related, "bring your own behavior" (BYOB). BYOD or BYOT concerns corporate/business policy of how employees can bring and use personal mobile devices at work and access employers' email, databases and files, while otherwise using such devices at home, whereby personal applications/data are accessed though the same devices. Beyond hardware, BYOB extends this to software used on the device.

Today it is known that any software executed on a computer may be under attack by a number of viruses and malicious softwares (malware) that may be present on the PC's operating system. One solution for this problem is to restart a PC from an external boot media, e.g., stored on a user-trusted device, typically a secure device, and start a new and—from a security perspective—clean operating system (OS) from the external media.

However, this approach raises notably one significant technical drawback, as present inventors have realized, which the present invention aims at resolving.

Besides, external boot media are often provided on trusted devices (including secure, tamper proof devices), which type of devices is generally known. For example, for online transactions, a solution which has been developed is the so-called Zone Trusted Information Channel (or ZTIC for short). The ZTIC is a secure, non-programmable device for the authentication of transaction data. Since the ZTIC maintains a secured end-to-end network connection to the server, the ZTIC itself is tamper-proof against malicious software attacks and as it has its own input and output components independent of the host it connects to, the data shown on the ZTIC display is genuine. More details can be found in e.g., "The Zurich Trusted Information Channel—An Efficient Defence against Man-in-the-Middle and Malicious Software Attacks", by Thomas Weigold, Thorsten Kramp, Reto Hermann, Frank Horing, Peter Buhler, Michael Baentsch. In P. Lipp, A. -R. Sadeghi, and K. -M. Koch (Eds.): TRUST 2008, LNCS 4968, pp. 75-91, 2008. Springer-Verlag Berlin Heidelberg 2008.

SUMMARY

According to a first aspect, the present invention is embodied as a user trusted device, comprising: a connection interface enabling connection with a computer; and a persistent memory storing modules, which are configured, upon connection of the user trusted device with said computer via said connection interface, to: enable said computer to start booting from the user trusted device; instruct a processor of the computer to execute virtualization sensitive code while starting to boot and to issue completion data upon completion of execution; determine, based on such completion data whether the execution was not performed in a virtualized environment; and enable said computer to complete booting from the user trusted device upon determining that the execution was not performed in a virtualized environment.

Preferably, said modules comprise: a bootloader enabling said computer to start and complete booting from the device; a processor instruction module, executable at the computer to instruct the processor to execute the virtualization sensitive code and issue the completion data; and a verification module configured to instruct to determine, based on said completion data, whether the execution was not performed in a virtualized environment, the verification module executable at the device and/or at the computer, wherein the bootloader is detectable by the initialization firmware upon connection of the user trusted device with said computer and comprises instructions for the firmware to initiate a transfer of said processor instruction module onto the computer for subsequent execution at the computer.

According to a first class of embodiments, the processor instruction module is further configured to instruct, upon execution at the computer, the processor to execute virtualization sensitive code designed for the processor to produce as part of the completion data a list of one or more features supported by the computer, and preferably by the processor itself.

According to a second class of embodiments, the processor instruction module is further configured to instruct, upon execution at the computer, the processor to produce as part of the completion data a final state value dependent on a computational effort of the processor needed to execute said virtualization sensitive code, and, preferably, the processor instruction module is further configured to instruct, upon execution at the computer, the processor to produce an initial state value reflecting a state of the processor prior to executing said virtualization sensitive code.

In embodiments, the verification module is executable at the device 10 to produce, based on the initial state value and the final state value, a processor usage value quantifying the computational effort of the processor needed for executing the virtualization sensitive code, such as a computation time duration, a number of processor cycles, or a counter, and the verification module is further configured to instruct to determine, based on said processor usage value, whether the execution was not performed in a virtualized environment.

In other embodiments, the processor instruction module is further configured to instruct, upon execution at the computer, the processor to produce as part of the completion data a processor usage value quantifying the computational effort of the processor needed for executing the virtualization sensitive code, such as a computation time duration, a number of processor cycles, or a counter, and the verification module is further configured to instruct to determine, based on said processor usage value, whether the execution was not performed in a virtualized environment.

Advantageously, the verification module may further be configured to instruct to connect to a server, preferably via said computer, for determining at least partly at the server whether the execution was not performed in a virtualized environment.

For instance, the verification module may be configured to perform one or more of:
  interacting with said firmware to subsequently interact with a network card of the computer, in order to initiate a communication over a network as enabled by said network card, to connect to the server;
  accessing network card drivers stored on the user trusted device to directly interact with a network card of the computer, in order to initiate a communication over a network as enabled by said network card, to connect to the server; and/or interacting, preferably via the bootloader, with the firmware to partly run an operating system of the computer, as necessary to connect to the server via said computer.

Preferably, the virtualization sensitive code comprises one or more of:

instructions to switch the processor from a protected mode to a real mode and/or instructions to switch the processor from a real mode to a protected mode;

instructions for the processor to read a machine specific register; and instructions for the processor to write to a machine specific register.

According to another aspect, the invention is embodied as a method for enabling a computer to boot from a user trusted device, the user trusted device comprising a connection interface enabling connection with said computer, the method comprising: enabling said computer to start booting from the user trusted device upon connection of the user trusted device with said computer via said connection interface; instructing a processor of the computer to execute virtualization sensitive code and issue completion data upon completion of execution, which completion data depends on the virtualization sensitive code and its execution by the processor; determining, based on said completion data, whether the execution was not performed in a virtualized environment; and enabling said computer to complete booting from the user trusted device upon determining that the execution was not performed in a virtualized environment.

Preferably, the method further comprises interacting with an initialization firmware of the computer, upon connection of the user trusted device with said computer, to enable said computer to start booting from the user trusted device; and initiate a transfer of a processor instruction module onto the computer for subsequent execution at the computer, to cause the processor to execute the virtualization sensitive code and issue the completion data upon completion of execution.

In preferred embodiments, determining whether the execution was not performed in a virtualized environment comprises executing a verification module at the device and/or at the computer, and executing the verification module preferably comprises connecting to a server, more preferably via said computer, for at least partly determining at the server whether the execution was not performed in a virtualized environment.

According to said first class of embodiments, the processor is further instructed to produce as part of the completion data a list of one or more features supported by the computer, and preferably by the processor itself.

According to said second class of embodiments, the processor is further instructed to produce as part of the completion data a final state value dependent on a computational effort of the processor that was needed for executing the virtualization sensitive code, such as a computation time duration, a number of processor cycles, or a counter, wherein, preferably, the processor is furthermore instructed to produce an initial state value prior to executing the virtualization sensitive code.

According to a final aspect, the invention is embodied as a computer program product for enabling a computer to boot from a user trusted device, the computer program product comprising a computer-readable storage medium having modules embodied therewith, the modules allowing for performing all the steps of any of the methods according to the above embodiments.

Devices, systems and methods embodying the present invention will now be described, by way of non-limiting examples, and in reference to the accompanying drawings. The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
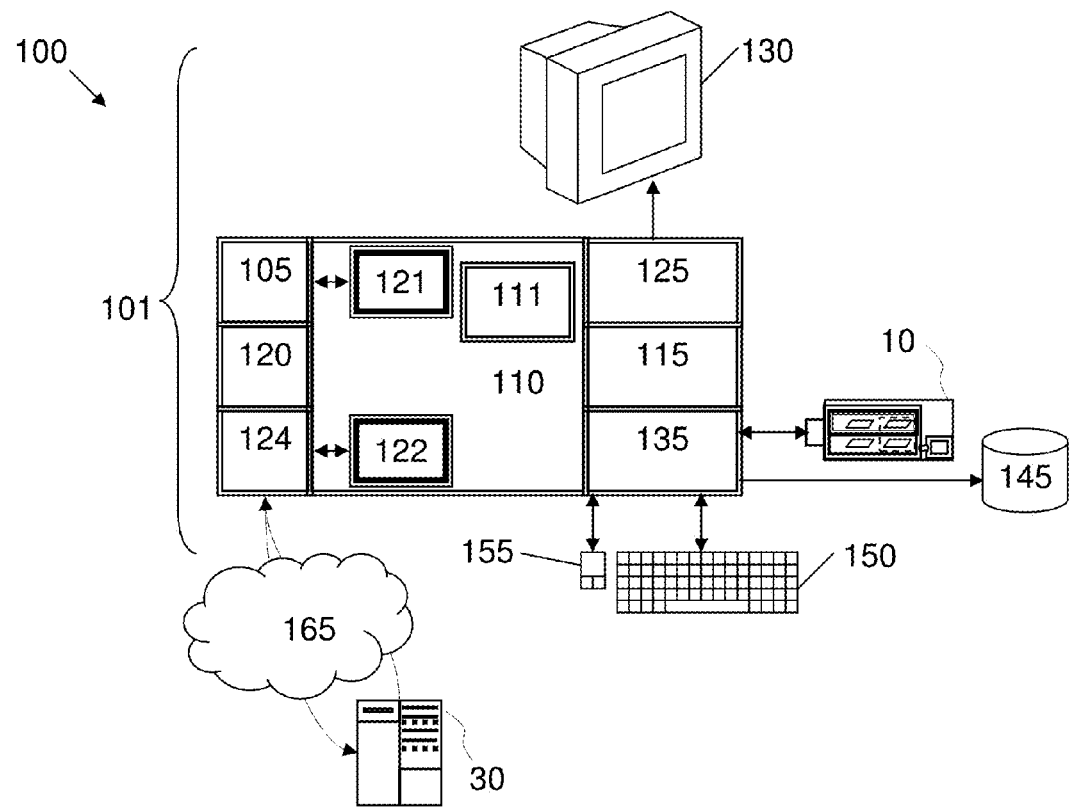
FIG. 1 schematically represents a general purpose computerized system, suited for implementing one or more method steps as involved in embodiments of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The invention relates in general to the field of user trusted devices enabling computers to boot therefrom, as well as related devices, systems and methods. While the present disclosure is not necessarily limited to such applications, various aspects of the disclosure may be appreciated through a discussion of various examples using this context.

The following description is structured as follows. First, general embodiments and high-level variants are described (sect. 1). The next section addresses more specific embodiments and technical implementation details (sect. 2).

1. General Embodiments and High-level Variants

FIG. 1 represents a general computerized system, suited for implementing method steps as involved in embodiments of the invention.

It will be appreciated that the methods described herein are largely non-interactive, and automated by way of computerized systems, such as servers or embedded systems. In exemplary embodiments, the methods described herein can be implemented in a (partly) interactive or non-interactive system. These methods can further be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The most general system 100 therefore includes general-purpose computer 101.

In exemplary embodiments, in terms of hardware architecture, as shown in FIG. 1, the computer 101 includes a processor 105, memory 110 coupled to a memory controller 115, and one or more input and/or output (I/O) devices (or peripherals) 10, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 145 may generally include any generalized cryptographic card or smart card known in the art. One of these devices is a user trusted device 10, discussed below in detail.

The processor 105 is a hardware device for executing software, particularly, software that is stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile (persistent) memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105. In particular, memory 110 shall include a given memory portion 121 to which a processor instruction module (or PIM) 15 and possibly a verification module 17 can be transferred, in whole or in part, for subsequent execution.

The software in memory 110 may include one or more separate programs, each of which comprises a listing of executable instructions for implementing logical functions, notably functions involved in embodiments of this invention. In the example of FIG. 1, memory 110 may be loaded with instructions for enabling the computer 101 to start and complete booting from the user trusted device 10, if some conditions are verified.

The software in memory 110 may include a suitable operating system (OS) 111, even if the novel methods discussed here operate at least partly "before" any OS is fully loaded at the host 101 (at least some of the steps operate at another level, closer to hardware, whereby the normal behavior of the computer 101 is impacted). Once (and if) loaded, an OS 111 shall essentially control the execution of other computer programs, and provide scheduling, input-output control, file and data management, memory management, and communication control and related services.

Note that the OS to be loaded is preferably not initially stored on the computer's hard disk drive 120. This might notably be the case in such scenarios where a private computer is to be started without using any of the owner's private data stored thereon. Yet, in some situations, it may be useful to cache an OS started by the trusted device in a separate area on the computers hard disk. In the preferred embodiments described below, the OS to be loaded is initially contained in the user device 10, loaded through the network, or cached on the computer's hard drive. In the latter case; a signature of the OS is typically verified.

At least part of the methods described herein may be in the form of a source program, executable program (object code), script, or any other entity comprising a set of instructions to be performed. When a source program, then the program needs to be translated via a compiler, assembler, interpreter, or the like, which may or may not be included within the memory(ies) of the device 10 and/or the host 101. Furthermore, the methods can be written as an object oriented programming language, which has classes of data and methods, or a procedure programming language, which has routines, subroutines, and/or functions. In all cases, the novel methods discussed herein are designed so as to operate properly in connection with the firmware 122, where needed, and with the device's CPU 11, as needed.

In exemplary embodiments, a conventional keyboard 150 and mouse 155 can be coupled to the input/output controller 135. Other output devices such as the I/O devices 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. As described herein the I/O devices 140, 145 can be any generalized cryptographic card or smart card known in the art. The system 100 can further include a display controller 125 coupled to a display 130. In exemplary embodiments, the system 100 can further include a network interface 160 for coupling to a network 165. The network 165 can be an IP-based network for communication between the computer 101 and any external server, client and the like via a broadband connection. The network 165 transmits and receives data between the computer 101 and external systems, e.g., a server 30. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) or any similar initialization software 122. The BIOS is a set of essential software routines that initialize and test hardware at startup. It is otherwise generally able to start an OS, and support the transfer of data among the hardware devices. The BIOS is typically stored in ROM so that the BIOS can be executed when the computer 101 is activated.

For the purpose of implementing methods as described herein, the BIOS 122 can be used (interacted with) notably to initiate the boot process and complete it, as well as, possibly, to initiate a communication over a network. More generally though, any suitable firmware 122 or interface to a firmware (i.e., a combination of persistent memory and program code and data stored therein, which operates "below" any OS 111 in the software stack), can be used to that aim. This typically is the BIOS. However, examples of suitable firmwares 122 or interface thereto include a Preboot eXecution Environment (PXE) BIOS, the so-called Extensible Firmware Interface (EFI) BIOS or, still, the Unified Extensible Firmware Interface (UEFI). The latter is a specification that defines a software interface between the operating system and the platform firmware. UEFI is meant to replace the BIOS firmware interface, present in all IBM PC-compatible computers today. In practice, most UEFI images have legacy support for BIOS services. More generally, any firmware having legacy support for BIOS services or comparable services can be contemplated for the purpose of implementing methods described herein. Even more generally, any initialization firmware operating below the operating system in the software stack may potentially convene for the purpose of implementing the present invention.

When the computer 101 is in operation, the processor 105 is configured to execute software stored within the memory 110, to communicate data to and from the memory 110, and to generally control operations of the computer 101 pursuant to the software. The methods described herein, in whole or in part, but typically the latter, are read by the processor 105, possibly buffered within the processor 105, and then executed.

The portions of the methods described herein that can be implemented in software can be stored on any computer readable medium for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely firmware and/or software embodiment (firmware, resident software, micro-code, etc.) or an embodiment combining firmware/software and hardware aspects that may all generally be referred to herein as "modules", "computerized methods", "processes" or "schemes", etc. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, or partly on the user's computer (as a stand-alone software package), or still partly on two or more of the following: the user's computer 101, the user trusted device 10, and a remote computer 30. The host computer and the server may be connected through any type of network, including: local area network (LAN); wide area network (WAN); connection to an external computer (Internet, using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As touched earlier, restarting a computer from an external boot media and start a "clean" OS ("clean" from a security perspective) from the external media, or an otherwise trusted OS, is one way of solving the problem that any software executed on a PC may be under attack by a virus or malicious software (malware) that may be present on the PC's operating system.

However, as present inventors have realized, this approach notably raises the following question: Is it indeed the authentic user who restarted the PC? Or is a malicious virtualized environment started to tamper with the clean OS newly started. Also, it might be possible that security-unaware and/or convenience-preferring users try to utilize such concept to get around restarting the computer.

Figure 2:
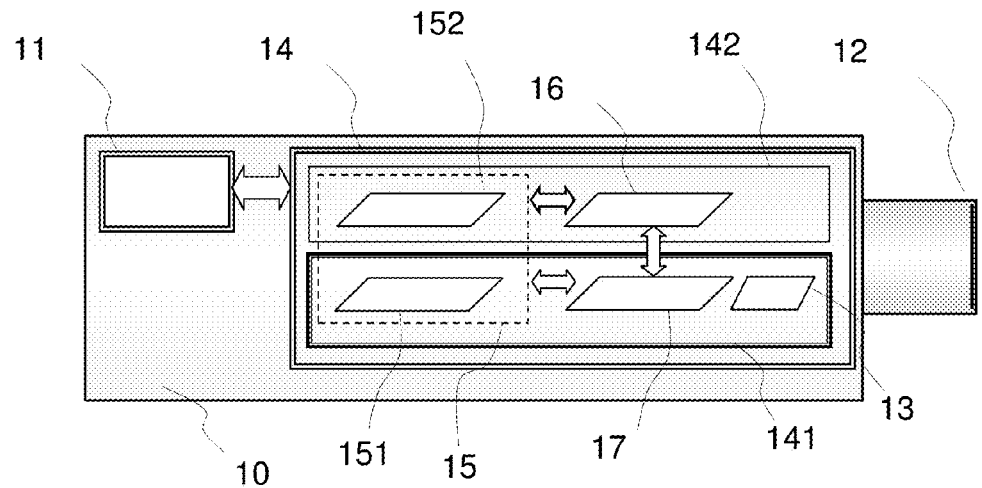
FIG. 2 schematically illustrates selected components of a user trusted device, as involved in embodiments.
Figure 3:
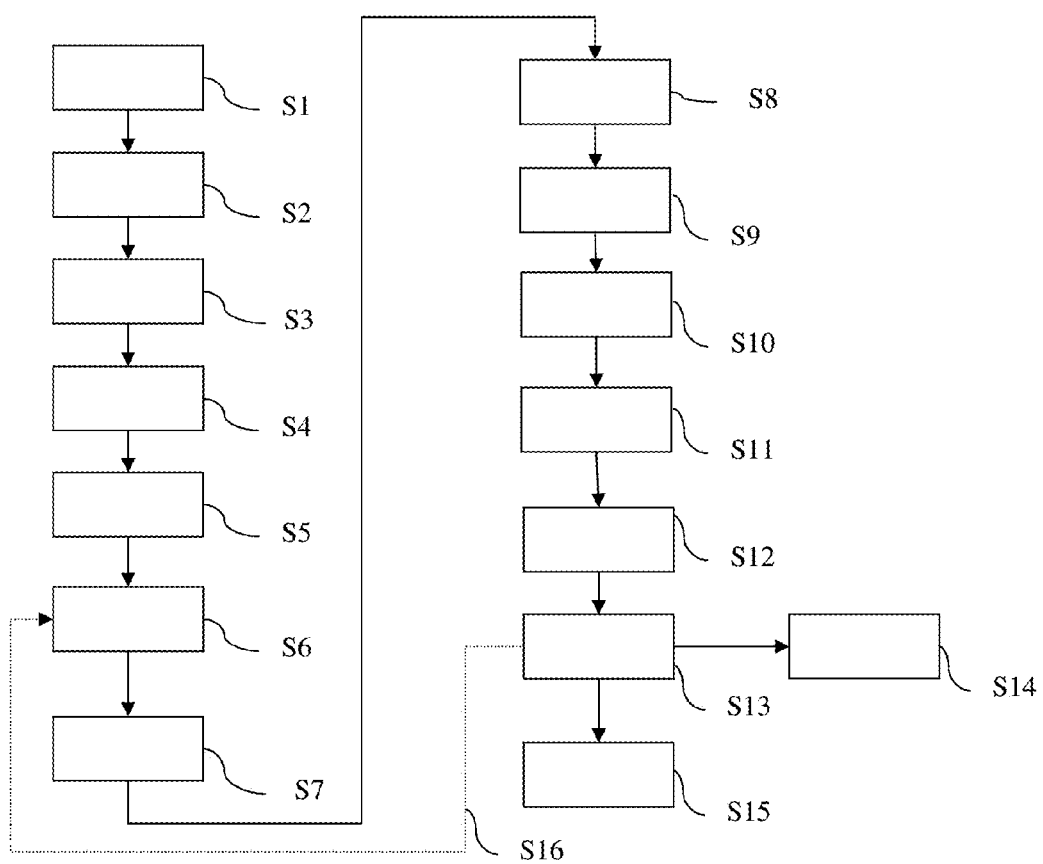
FIG. 3 is a flowchart illustrating high-level steps of a method for enabling a computer to boot from a user trusted device such as depicted in FIG. 1, as in embodiments.

Referring generally to FIGS. 1 to 3, an aspect of the invention is first described, which concerns a secure device 10 (or more generally a user trusted device, also called external trust anchor). This device is a corporate or personal device, that is, a device that a company or a user owns and controls, such as a USB device, preferably a USB flash drive (a data storage device that includes flash memory, in addition to an integrated Universal Serial Bus (USB) interface), a mobile phone or a personal digital assistant (PDA) that only this user uses or that is owned and controlled by the company this user works for. Typically, this device weighs less than 200 g, preferably less than 60 g and more preferably less than 40 g. Additional aspects of this device 10 that may contribute to make it "secure" shall be discussed later.

At least, this device comprises: a connection interface 12 enabling connection with a computer 101; and a persistent memory 14, which notably stores a number of modules 15, 16, 17. The latter are designed such as to enable execution of a number of operations, at the device 10 and/or at the computer 101, upon connection of the device 10 with computer 101 via said interface 12.

Assume that such a device 10 and a computer 101 are provided (step S1 in FIG. 3). Then, upon connection of the device (step S2), the above operations shall essentially consist, on a high level, in:

Enabling (step S3) said computer 101 to start booting from the user trusted device 10;

Instructing the processor 105 to execute (step S7) some reference code;

Note that the code is preferably provided by the device 10 itself, e.g., by the processor instruction module 15. In variants, an identifier or still an address of the code could be passed to the processor 105. This code typically include several instructions, which may depend on the machine tested;

This code is chosen so as to be sensitive to a virtualized environment and is therefore referred to as a "virtualization sensitive code". Namely, this code executes differently and gives rise to different execution characteristics depending on whether it is executed in a virtualized environment or natively. The execution characteristics can notably differ in:

A result that is produced from the execution (this concerns a first class of embodiments described below); and/or A computational effort, measurable by way of timing characteristics, processor cycles, etc. (second class of embodiments).

For instance, a computation that of special interest for x86 based PCs would be to switch between real mode and protected mode.

Other examples of virtualization sensitive code will be given later;

As per instruction to the processor, execution of the virtualization sensitive code occurs while computer 101 starts booting, i.e., after the boot process has began and before it completes, i.e., before major/critical components of the OS are loaded.

The processor 105 is further instructed to issue some completion data (e.g., a result, a timestamp, or a timestampable event, etc.) upon completion of the execution, step S8 in FIG. 3;

The next set of operations (S9-S13) is to determine, based on the completion data, whether the execution was not performed in a virtualized environment (or, equivalently, whether the execution was performed in a safe environment, e.g., natively); and Finally, if it is determined that the execution was not performed in a virtualized environment, the computer 101 can be enabled to complete booting (step S15) from the device 10. In embodiments, this condition is indirectly ascertained, e.g., user-interactivity might be needed, as discussed notably in section 2.1 below. The condition to not run in a virtualized environment is not necessarily a sufficient condition: it is a necessary condition in the context of this invention; other conditions may be involved, as discussed notably in section 2.2 below (e.g., the BIOS can be tested as well).

If it is determined that the execution was not performed in a virtualized environment, the boot process is continued (step S15), e.g., more data, key, software, boot image, etc. can be provided to the computer 101 to that aim.

If, on the contrary, it is determined that the execution was performed in a virtualized environment, then the boot process is aborted (step S14). The device 10 can for instance be shut down, i.e., no data, key, software, etc. is handed out to the computer 101.

Intermediate situations can be contemplated, which may lead to loading a restrained version of the OS (not all components are allowed), or a modified version of the OS, where patches/programs are loaded to clean the computer 101.

Computer 101 is typically a personal computer (PC), preferably a PC for mobile use, notebook or netbook, or a PDA or a smartphone. It is referred to herein as (host) computer or PC, for simplicity.

To summarize, the principle underlying the present invention is that:

The modules 15-17 are initially stored on the trusted device 10, such that the user can trust them;

The modules are at least partly executable at the PC to force its processor to execute the virtualization sensitive code.

Said modules cause to analyze outputs of the execution to ascertain that the environment is not virtualized and, if so, the boot process is continued.

Identifying a virtualized environment is advantageous notably for the following reasons:

A modified BIOS may pretend to the trusted device 10 to be booted normally from the host computer while in fact the computer is virtualized. The virtualized computer would present to the trusted device like the real computer but may modify certain computer instructions to be able to modify the system to be started using the trusted device whenever the virtualization layer deems fit.

The user may voluntarily try to boot the system provided on/via the trusted device in a virtualized environment. Reasons for doing this may be to not have to reboot a private PC and keep the private programs already started. I.e., to not have to stop his private programs to do corporate work and restart them when the corporate work is done. However, by doing so, the user would expose the system from the trusted device to the same risks as above. I.e., the system would be exposed to any malware present on the computer that realizes that sensitive computations are carried out as part of the virtual machine execution.

Be it for the two reasons above, it is desirable for the trusted device 10 to be able to identify whether the computer 101 presented to the device is real or virtualized, whence the present solution.

Referring now more specifically to FIG. 2: in embodiments, said modules 15-17 decompose into:

a bootloader 16, enabling the PC 101 to start (and eventually to complete) booting from the device 10;

a processor instruction module (or PIM) 15, which is essentially executable at the PC to instruct its processor 105 to execute the virtualization sensitive code and issue the completion data; and a verification module 17. This module is executable at the device 10 and/or at the computer 101, and is designed to analyze (directly or not) the completion data.

The bootloader 16 is detectable by the initialization firmware, e.g., the BIOS 122, upon connection of the trusted device 10 with the PC 101. The bootloader further comprises instructions for the firmware 122 to initiate a transfer of the PIM 15 onto the PC 101 for subsequent execution at the PC.

Incidentally, modules 15 and 17 could be regarded as a single entity (call it a virtualization analysis module or VAM), whose functions are not only to instruct the processor but also to analyze the completion data.

As touched earlier, in a first class of embodiments, the PIM 15 may instruct the processor 105 to execute code causing it to produce as part of the completion data a list of features supported by the computer 101, preferably by the processor itself. One such feature is whether hardware virtualization support is provided by the CPU (i.e., in the form of the vtx bit set in the CPU's feature register and the vtx-enable bit in the corresponding model specific registers). If not but the CPU reported by the cpuid instruction is capable of hardware virtualization, this is an indication for running inside a virtualized environment that does not emulate these instructions in software. Other such capabilities would be to check the hardware present in the system whether a virtualized graphics (in case of the typical para-virtualized environment) card is present or the real one.

Next, the verification module or VAM may compare the list of features supported to some reference data and conclude as to whether the execution was performed in a virtualized environment. Such operations can be executed directly by the CPU 105 or at the user device 10, or jointly at the device and the CPU.

More robust is, however, to cause the processor 105 to produce or use, a final state value, upon completion of the execution and as part of the completion data. This value that is dependent on, i.e., impacted by the computational effort of the processor that was needed for it to execute the virtualization sensitive code. Such a value can for instance be a timestamp, or an instruction for the device 10 or any module thereof (be it executed at the device 10 or at the PC), which upon reception can be timestamped, etc. This value can furthermore be or refer to a number of processor cycles, a maximum CPU usage during a given number of preceding cycles or a given time, a time, etc., as of after execution. By comparing this value to some suitable reference value, it is then possible to conclude as to whether the execution was performed in a virtualized environment.

The second class of embodiments is more reliable than the first one, inasmuch as certain features supported by the processor 105 or the machine 101 could have been disabled (e.g., by a vendor) such that it is not easy to ascertain a non-virtualized environment.

Preferably, the processor 105 may further produce or use an initial state value, i.e., a value reflecting the state of the processor prior to executing the virtualization sensitive code. Again, the initial state value may be a timestamp, an instruction for the device 10 or a module thereof, a number of processor cycles, a time, etc.

Having both the initial and final values, a processor usage value is easily derived, i.e., a value that directly and explicitly quantifies the computational effort that was needed for executing the virtualization sensitive code. Such a processor usage value may for instance be a computation time duration, a number of processor cycles, or any suitable counter. Still, a processor usage value could be produced independently from an initial value. For example a maximum CPU usage (during a given number of preceding cycles or a given preceding time) would be indicative of the computational effort required to execute a given set of instructions.

Although a final state value may already suffice, using a processor usage value as defined above allows for a more direct and relevant comparison (as it directly and explicitly quantifies the computational effort required for the execution).

The verification module 17 is next involved to analyze the final state value/processor usage value and then determine whether the execution was not performed in a virtualized environment. To that aim, the verification module 17 may simply compare the final state value/processor usage value to reference values, available at the device 10 or via a third party 30. In variants, the verification module 17 may trigger a concurrent execution (performed at the device 10 or at a third party 30) of the same virtualization sensitive code as executed by the processor 105 and then proceed to a comparison, before concluding.

Also, note that the calculation of the processor usage value may be performed directly by the processor 105 or by the verification module 17 (executing either at the device or at the PC), using the initial and final state values recorded or issued to that aim. It is however preferable to execute this calculation at the device (a thing that involves CPU 11 for execution), as such a solution can less easily be tampered with, as the usage value calculated in the device 10 cannot easily be manipulated. However, extra communication overhead is required (between PC 101 and device 10), which might add some inaccuracies.

The analysis of the final state value or the processor usage value by the verification module 17 may be performed at the PC or at the device 10. Whether to execute the calculation of the usage value and the analysis at the device or the PC can be decided during a design phase or, even dynamically, at execution, based on known or detected communication overhead characteristics of the PC.

Should the calculation of the processor usage value be left to the processor (e.g., a counter is incremented on the PC), then it is preferable to rely on a CPU's time stamp counter. This counter counts the CPU cycles, and is thus highly accurate. Tampering with a CPU's time stamp counter requires substantial work.

An example of sequence of operations is the following:
The trusted device 10 and PC 101 are provided;
The device 10 is plugged into the PC 101;
The bootloader 16 is detected by the initialization firmware 122, the PC starts booting from the device 10;
The bootloader 16 instructs the PC to transfer the PIM 15 (or even the VAM 15 +17), to a given memory location 121;
The PIM 15 starts executing, i.e., it is executed by the processor 105;
While being executed, the PIM's instructions to the processor cause the latter to:
Record (or issue) the initial state value;
Start executing virtualization sensitive code indicated by the PIM 15;
Records final state value;
Compute a processor usage value, e.g., a duration;
Next, the verification module 17 or VAM 15 +17 intervenes, by way of instructions for the CPU 105 and/or the device's processor 11 to trigger the following operations:
Compare (or instruct yet another, e.g., external entity 30 to compare) the processor usage value with a reference value; and
Conclude as to whether the execution was performed in a virtualized environment.

The last two operations can be executed directly by the CPU 105 or at the user device 10, or jointly at the device and the CPU, or still involve another entity 30, as to be discussed later.

The virtualization sensitive code may comprise one or more instructions. Examples are instructions to switch the processor from a protected mode to a real mode and/or instructions to switch the processor from a real mode to a protected mode, as touched earlier. Such instructions are especially advantageous for x86 based PCs. The computation can be done in hardware and is quick. On the contrary, when executed within a virtual machine, the virtual machine has to catch these instructions (which can only be done through a CPU exception), and then execute them in software or other mechanisms taking even longer. Not even CPUs with hardware virtualization support can do this in hardware because real mode is considered legacy and hardware virtualization is not available for these features.

There are other examples of virtualization sensitive instructions that could advantageously be used in the present context, for instance:
Instructions for the processor to read a machine specific register, i.e., "rdmsr";
Instructions for the processor to write to a machine specific register ("wrmsr"); and/or
Instructions to enable the so-called a20 gate (but this is not preferred, owing to the complexity of implementation that this requires).

More generally, any other instruction that has different resource characteristics when executed natively than in a virtualized environment can be contemplated.

For the sake of illustration, assume that all instructions are executed by the processor 105 (including the calculation of the processor usage value). One would in that case typically distinguish two types of instructions (setup instructions vs. virtualization sensitive code) of the PIM/VAM 15, 17, which are now described in reference to FIG. 3:

a. Initial setup:
i. Put processor 105 into protected mode (hereafter PM) to ascertain that the processor is in protected mode;
ii. Allocate memory for subsequent computation (step S7) and completion data issuance (step S8);
iii. Record start time (step S6);
b. The virtualization sensitive instructions can use, e.g., any of:
i. Mode switch instructions, including:
1. Switch from PM to real mode (hereafter RM), which, in comparison, a virtualized environment would take longer to emulate;
2. Switch from RM to PM;
ii. Read instructions to read machine specific register (rdmsr);
iii. Write instructions to write to machine specific register (wrmsr);

Note that the Virtualization sensitive instructions could be carried out by way of a subroutine (executed by the processor), called by the processor upon instruction from the PIM/VAM. This option is notably preferred when the virtualization sensitive instructions include other hardware components that would have to be virtualized such as a graphics card, for instance. In this case, the virtualization sensitive code would interact with a Graphics Processing Unit (GPU) and execute instructions that when run in a virtualized environment would have to be emulated in software and hence take longer. There are other possible variants.

c. Final setup:
i. Record final state value (e.g., end time);
ii. Compute the processor usage value (e.g., duration)
iii. Compare to reference value;
iv. Conclude as to virtualized environment Again, although the final setup was assumed to be directed to the processor 105 in the above example, the final operations could be performed at the processor and/or the device 10. In case the final instructions are at least partly directed to the device 10, these instructions needs to be arranged somewhat differently in order for the processor to signal to the device 10 to execute the final instructions.

A possibility alluded to earlier is to involve a third part, e.g., a server 30 (see FIG. 1), to accomplish part or all of the analysis of the processor usage value obtained (or even the final state value only). In that case, the verification module 17 is further configured to instruct the device or, preferably, the computer 101, to connect to a server 30. A "central" server can more easily be updated as to the various possible, ever changing machine states.

To that aim, the verification module 17 may be configured to interact with one or more of:
the initialization firmware 122, to subsequently interact with a network card 124 of the computer 101, and this, in order to initiate a communication over a network 165 (as enabled by the network card 124) and connect to the server 30;
directly with the network card 124 of the computer 101: this requires accessing network card drivers stored in that case on the trusted device 10; and/or
with the firmware 122, e.g., via the bootloader, to partly run an OS of the computer 101, i.e., load these components of the OS that are necessary to connect to the server 30 via the PC 101.

Communications between the device 10 and the external entity 30 shall preferably be carried out by means of:

An HTTP connection from server 30 to device 10 through computer 101;

End-end authentication; and

Signature and other encryption data 13, if needed, which can be stored on a secure memory 141 of the device 10.

As a radical alternative, one may prefer to have the device 10 equipped with network access means, e.g., with a network device (wired or wireless), such as to connect directly to a server. Such a solution is somewhat more expensive. However, latency is reduced since no additional interactions with the computer 101 are needed to contact the server. Here also the communications with server 30 may use end-end authentication and encryption.

Next, referring more particularly to FIG. 2, the persistent memory 14 shall preferably comprise:

a secure memory 141, onto which a first part 151 (or given portions) of the PIM 15 or the VAM 15-17 may be stored; and a non-secure memory 142, e.g., an SD card, onto which a second part 152 (or other portions) of the module(s) 15, 17 may be stored.

The presence of a secure memory makes the user trusted device a secure device. For example, a part of the module 15 may reside encrypted on the non-secure memory 142, while a corresponding encryption key 13 is stored on the secure memory 141. The secure memory is typically limited to 128 ko or 256 ko, for cost reasons. It can thus preferably be used to merely store encryption data, e.g., hashes/signatures 13. Part 151 of a module can therefore reside on the secure memory 141 while other parts 152 of the module may reside encrypted on the non-secure memory 142. Similarly, the bootloader 16 can reside on a SD card, yet encrypted with signature residing on the secure memory 141. When computer 101 requests a given block or any data chunk of the bootloader, then the device's CPU 11 shall be prompted by software residing in memory 14 to decrypt the requested block, e.g., using encryption data stored on the secure memory 141.

Preferably, the portion(s) of the module(s) 15-17 that reside on the secure memory shall occupy less than half a size of the secure memory, owing to memory constraints. Ideally though, all parts of the modules shall occupy as little memory as possible. For instance, some implementations of the module 15 have been successfully tested which use less then 4 ko for each part of the modules 15-17 (excluding code to contact a network server which would consume approximately 32 ko, and typically less than 64 ko). Those skilled in the arts will appreciate that code implementing the functionality to contact a remote server can be shared along multiple modules stored on the user trusted device 10.

The connection interface 12 of the device 10 may for instance be of the following type:

Universal Serial Bus or USB;

External Small Computer System Interface or SCSI;

External Serial Advanced Technology Attachment or SATA;

Firewire; or

Thunderbolt.

More generally though, this could be any current or future connector (wired or wireless) that allows the computer to boot from the external device 10. In addition, the same interface 12 can furthermore allow the user trusted device 10 for communicating with any external device such as a beamer, a printer, or any other output device.

As usual, the user trusted device 10 may be provided with processing means (or computing means, i.e., CPU) 11, such as a crypto Processor, coupled to a memory, which more generally comprises a persistent memory 14 and, preferably, a non-persistent memory too (not explicitly shown but the non-persistent memory can be considered to be part of the processing means 11).

In the present context, the persistent memory notably stores computerized methods, e.g., modules 15-17 evoked above, to be executed by the processing means 11, 105. Of course, the modules 15-17 evoked herein could be considered as a single module provided with different functions, and able to execute at the device and at the computer.

If necessary, the secure device 10 has a card reader to read user credentials stored on a memory card, e.g., the non-secure memory 142 or any smart card. Suitable use can safely be made out of such data, e.g., user credentials as stored on the card. In particular, a trustworthy connection can be established between a user (or strictly speaking the device 10) and a third party, e.g., server 30, via the host 101 and using such data. In a variant, the user credentials may be stored directly on the secure device. Further interfaces (like control buttons and display) may be provided to allow for interaction with the user.

Next, the invention can equally be regarded as a method for enabling a computer 101 to boot from a user trusted device 10. This method at least comprises the following essential steps, already described in reference to the device 10:

Enabling S3 the computer 101 to start booting from the trusted device 10 upon connection S2 of the trusted device with the computer 101 via the connection interface 12 of the device 10;

Instructing the processor 105 to:

Execute S7 the virtualization sensitive code; and

Issue S8 the completion data upon completion of execution;

Determining S9-S13, based on said completion data, whether the execution was not performed in a virtualized environment; and Enabling S15 the computer 101 to complete booting from the user trusted device 10, provided that it has been determined that the execution was not performed in a virtualized environment.

As already said earlier, the bootloader is preferably involved to interact with the initialization firmware 122, and this, in order to:

Enable S3 said computer 101 to start booting from the user trusted device 10; and Initiate S4 the transfer of the PIM 15 (or VAM 15 +17) onto the computer 101 for subsequent execution S5-S6. As already explained, this causes the processor 105 to execute S7 the virtualization sensitive code and issue S8 the completion data upon completion.

In addition, the determination steps S9-S13 may involve a verification module 17, executed at the device 10 and/or at the computer 101, as well as a server 30, preferably connected to via the computer 101

Thus, the verification module 17 may:

assess the completion data locally at the device 10 or at the computer 101; or connect to a server which assesses the completion data e.g., by comparing said completion data to reference data.

In the latter case, the server may proceed to a comparison and conclude as to whether the execution was performed in a virtualized environment or not (in that case the module 17 just receives an instruction from the server to indicate whether to complete booting or to perform some other action); or the server may communicate a result of the assessment to the verification module 17, which module 17 completes the determination and conclude as to whether the execution was performed in a virtualized environment. Additional steps and communication steps with the server may be involved, if necessary, depending on the sophistication of the scheme.

If necessary, the verification module 17 may trigger the execution of additional instructions by processor 105, step S16, e.g., for clarifying unconvincing results from a first test.

The above embodiments have been succinctly described in reference to the accompanying drawings and may accommodate a number of variants. Several combinations of the above features may be contemplated. Examples are given in the next section.

2. Specific Embodiments/Technical Implementation Details

Specific embodiments are now discussed, which combine several optional features discussed in the previous section. In addition, and complementary to whether the virtualization sensitive code is executed in a virtualized environment (section 2.1), novel methods that allows to identify whether the PC's firmware 122 has been tampered are presented in section 2.2. Typical examples of instructions that can be used in embodiments are given in sect. 2.3.

2.1 Detecting Execution within a Virtual Machine: Specific Embodiment and Variants In a specific embodiment, the following sequence of steps is implemented. Assuming that the trusted device 10 was connected to the PC 101, the PC was restarted, the bootloader detected and the PIM 15 already transferred to the PC for subsequent execution:

1. The trusted device 10 is informed that a known computation is started on the PC 101. The external device 10 records the initial state time, i.e., the last known time value before of when exactly the computation has started.

2. The computation is started. The computation itself is of a nature such that its timing characteristics differ when executed natively from when executed in a virtualized environment, e.g., an instruction to switch between real mode and protected mode. More generally, any instruction that the processor can quickly perform if the hardware can be used. Example of such instructions are rdmsr, wrmsr (read/write model specific register instructions, as evoked earlier), or rdtsc (read timestamp counter) if set in the corresponding model specific register as well. Other examples can be found, e.g., in the x86 assembly instruction manual.

3. When the computation is finished, contact the external device 10.

4. The trusted device then checks how long the computation took and based on a comparison with a reference value (which can for instance be obtained via the same computation being concurrently executed, e.g., internally at the device 10) or which may have been pre-computed, determines the likelihood of that computation being executed in a virtualized environment.

a. The fastest virtualization support that present inventors examined so far is approximately 8 times longer than executing the code natively;

b. The virtualized environment was executed on a fast desktop PC whereas the native environment was an average notebook PC, hence on the same hardware the time difference is expected to be more than a factor of 8. This gives ample room to determine whether the proposed test code is executed in a virtualized environment or not.

c. For example, a smaller factor could be selected as threshold factor, e.g., a factor of 4 (which is already cautious);

5. If the external device 10 identifies the presence of a virtual machine, it may abort the operation, or preferably notify the user—and/or the securely connected server 30—to abort the operation and stop working.

6. If no virtualization environment has been detected, the device continues to operate such as to allow the PC to retrieve more software components that may be stored on the device 10 or gives out encryption keys or other authentication tokens to the software to be executed or a clean OS as mentioned earlier.

Multiple variations of the above steps can be contemplated.

Items 1 and 3 above may be combined with any timing source that cannot or only hardly be manipulated by a virtualization environment such as the PC's time stamp counter (TSC).

The timing values obtained may be correlated to the CPU in the PC to get an even better estimation of whether it is executed under a virtual machine or not.

In item 4 above, instead of a fully automated process, the device may present information to the user and ask him whether to proceed to boot the OS. This is of interest when the user is trusted (and is believed to be able to make such judgment calls). For example, the user could be informed of the fact that the PC took 30 ms to execute a given instruction, which typically takes 10-15 ms in a clean environment, whereas malicious executions typically need 100 ms. In this case, the user may conclude that the computation time is reasonable, e.g., because his machine is old. In another example, if the timing is indicated to be 65 ms, the user may conclude to a malicious environment, e.g., because the machine is recent and fast; and the timing should be in the 7-10 ms range.

This information could be presented objectively or, still, be coded (green, red or orange flag, 123, etc.).

Such design variants help to accommodate the fact that computers get faster every day. However, this requires knowledge on the user's side.

In item 4, the external device may interact with a server as otherwise described in the paper "The Zurich Trusted Information Channel—An Efficient Defence against Man-in-the-Middle and Malicious Software Attacks", cited in introduction, to ask the server for permission to proceed.

The above method is a heuristic one and does not stop an attacker that is determined and has resources and time to perpetrate an attack. However, chances are that by the time he has developed the attack a newer version of the software is available requiring an attacker to again change his setup. In other words, the above method is merely intended to put up many more roadblocks for any attacker to make it two orders of magnitude tougher to hack the system.

2.2 Detecting a BIOS that has been Tampered with

Restarting a computer from an external boot media and start a "clean" OS from the external media, or an otherwise trusted OS, raises another question, as present inventors have realized too: Can one trust the BIOS, and more generally any initialization firmware 122 involved at the PC's startup? Indeed, other initialization firmware can or could be prompted to execute while starting the computer, which could be infected as well.

To solve this additional issue, the device 10 may, in embodiments, be able to trigger or perform additional operations, which on a high level consist of:

Upon the computer 101 starting to boot from the device 10 (or after virtualization has been checked), mapping firmware data to a code (i.e., a mapping code), which firmware data comprise program code of the initialization firmware 122 and/or data accessible by the initialization firmware, e.g., the BIOS 122, while starting to boot;

Attesting trustworthiness of this mapping code; and

Enabling computer 101 to complete booting from the device 10 if the mapping code is attested (this is a further condition, in addition to whether it can be determined that no virtualized environment is involved).

This additional method allows for attesting trustworthiness of such firmware, by obtaining data that comprise program code of the initialization firmware and/or data accessible by the initialization firmware while starting to boot and subsequently checking such firmware data. The computer may thus, in embodiments, complete the boot process from the external boot medium 10 only if the firmware data is attested, in addition to whether it can be determined that no virtualized environment is involved.

Again, a key element of this additional approach is that it requires a PC-external trust anchor 10 that is, by definition, much less accessible by a malware or an attacker than a usual PC, PDA, etc. Another key element of these additional steps is to collect critical information about the PC, at the right moment, i.e., before the OS is started (or at least fully started), and reporting it to a trustworthy analysis, e.g., via a secured channel and finally, making a decision as to whether to start execution of the clean OS.

There are several possible variants as to what critical information, i.e., what firmware data to use. Using the program code of the firmware itself is already satisfactory inasmuch as it prevents an attacker to change the program code. Independently from the firmware's program code itself, using data accessible by the initialization firmware, such as configuration data for the initialization firmware, is also advantageous as, indeed, the configuration data (only) could be tampered with. Thus, ideally, both the firmware's program code of the initialization firmware and data accessible by the initialization firmware are used. Concerning configuration data: we can for instance use a hash value that is computed over a ROM or a CMOS ROM dedicated to or accessible by the firmware 122 (hence comprising both the firmware's program code and configuration data) while starting, as well as any other key identification strings. Such data characterize the firmware as well as the state of the firmware and therefore provides a sound basis as to whether said initialization firmware is compromised.

Also, mapping such data to a single code enable a quick checking and thus a quick attestation. One may for instance use a hash value computed over the BIOS's ROM, the BIOS's CMOS ROM, and/or other key BIOS identification strings. More generally, any algorithm/subroutine that is capable of mapping a firmware dataset to a code, preferably of a fixed length, such as a single integer, may be used for facilitating the subsequent check. While using a hash function appears more appropriate in many respects, a simple checksum could be relied upon. Now, depending on the security level desired, one may nonetheless prefer using fingerprints i.e., high-performance hash functions to uniquely identify substantial datasets, cryptographic hash functions or, still, randomization functions.

The code mapping can be performed before or after testing the virtualized environment. No reboot is necessary. For example, the order in which to execute the virtualization check and a CMOS checksum does not matter. However, both data items (virtualization data and hardware fingerprint) are advantageously computed and checked in a database. This way both the virtualization and hardware fingerprint need to match a white list. In addition, the virtualization and hardware fingerprint may be correlatively tested, rather than independently. For example, one may obtain virtualization data that in itself is acceptable, paired with an acceptable hardware fingerprint in itself, yet forming a combination that is not identified as correct, i.e., the virtualization data does not match the correct hardware profile. For instance, if the hardware fingerprint identifies a PC with a fast computer but the virtualization data produces a timestamp of a slow computer this can be identified by combining the two and checking a resulting combination, e.g., in a same database.

For instance, combining the two approaches described in section 2.1 and 2.2, the present invention could be embodied as user trusted device or correspondingly a method for enabling a computer 101 to boot from a user trusted device 10. Essentially, the user trusted device 10 again comprises a connection interface 12 enabling connection S2 with said computer 101, and the method comprises:

enabling computer 101 to start booting from the device 10 upon connection of the device 10 with said computer 101 via said connection interface 12;

mapping firmware data to a mapping code, the firmware data comprising code of an initialization firmware and/or data accessible by the initialization firmware 122 of the computer while starting to boot, and preferably a hardware dataset of the initialization firmware;

attesting trustworthiness of the mapping code;

instructing a processor 105 of the computer 101 to execute virtualization sensitive code and issue completion data upon completion of execution, which completion data depends on the virtualization sensitive code and its execution by the processor 105;

determining, based on said completion data, whether the execution was not performed in a virtualized environment; and enabling said computer 101 to complete booting from the user trusted device 10, if it is determined that the execution was not performed in a virtualized environment; and if the mapping code is attested; or if the virtualization metrics, the mapping code is correct, as well as the virtualization metrics correlatively with (with respect to) the mapping code.

Notes that steps 2-3 can, in variants, be performed after, parallel to or interlaced with steps 4-5.

As noted earlier, no reboot is necessary between steps 2 and 4 above. As a final comment though, it is noted that the computer mostly needs be (re-)started after connecting the device 10 thereto, or otherwise put into a state that allows it to start from the external device 10 (to perform step 1 above, i.e., to start booting), e.g., the following options are therefore possible:

Computer 101 is shut-off; plug device 10; start computer; or

Computer 101 already running; plug device; restart computer.

2.3 Examples of Instructions used in Embodiments

Examples of virtualization sensitive instructions have been discussed before. At present, examples of (sequences of) other instructions that could advantageously be used for implementing embodiments of the invention follow. The person skilled in the art shall appreciate that other instructions with the same/similar functionality exist that can be used to achieve essentially the same.

To start with, an example of API follows that allows for reading BIOS information ("firmware configuration data"):

outb(cmos_data_address, 0×70);
data_at_address=inb(0×71);
where cmos_data_address is iterated over the range 0 . . . max_cmos_data_address. Other similar instructions for reading the firmware's program code itself and/or configuration data thereof are provided by the Intel 82802AB/82802AC Firmware Hub (FWH).

In the EFI BIOS, the same instructions could be used to obtain the BIOS information, especially if e.g., the Intel Firmware Hub is used.

Next, an example of instructions is given that allows for interacting with the user trusted device from the PC:

Read a block from user trusted device (mass storage device)
  mov ah, 42h
  mov dl, the_drive_to_read_from
  mov ds:si, disk_address_packet_describing_what_to_read
  int 13h Write a block to user trusted device (mass storage device):
  mov ah, 43h
  mov dl, the_drive_to_write_to
  mov ds:si, disk_address_packet_describing_what_to_write
  int 13h In the EFI BIOS, the so-called EFI_DISK_IO_PROTOCOL or EFI_BLOCK_IO_PROTOCOL could be used, which both provide Read and Write functions.

Suitable disk I/O commands are easily accessible for the one skilled in the art.

Finally, an example of a sequence of instructions that can be used by the modules to initialize a PXE BIOS include but are not limited to:
  Load UNDI ROM
  PXENV_START_UNDI
  PXENV_UNDI_STARTUP
  PXENV_UNDI_INITIALIZE
  PXENV_UNDI_OPEN An additional instruction (e.g., PXENV_UNDI_TRANSMIT) could be appended to send packets to the server 30, via the network card 124. By way of such instructions, the modules interact, upon execution at the host, with the PXE BIOS 122 to initialize the network card 124, whereby a communication can be initiated over the network.

Similar instructions are provided by EFI and UEFI BIOSes in the EFI_SIMPLE_NETWORK API (Initialize, Start, Stop, Receive, Transmit). BIOSes may also provide higher level protocol implementations of the TCP/IP stack and other networking protocols which may be used as well.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated. For example, the main functions have been described as being assigned to respective modules 15, 16, 17, for the sake of clarity of the description. However, embodiments of the present invention could be equivalently described with the same functions distributed over one or more modules, each provided with different ones of these functions. For example, the bootloader 16 and the PIM 15 could be regarded as a single module, possibly referred to as a "bootloader", while still performing the same functions as otherwise described herein.

REFERENCE LIST

10 User Trusted Device
11 Secure Device's CPU
12 Connection Interface
14 Persistent Memory
141 Secure Memory
142 Non-Secure Memory
15 Processor Instruction Module (PIM)
151 First Part Of Processor Instruction Module (PIM)
152 Second Part Of Processor Instruction Module (PIM)
16 Bootloader
17 Verification Module
30 Server
15, 17 Virtualization Analysis Module (VAM)
100 General Computerized System
101 Host Computer
105 Computer Processor
110 Memory
111 Operating System (OS)
115 Memory Controller
120 Physical Storage Medium (Physical Disk)
122 Firmware (BIOS) Of The Host Computer
124 Network Card
125 Display Controller
130 Display
145 I/O Devices (Or Peripherals)
150 Keyboard
155 Mouse
165 Network The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:
1. A user trusted device, comprising:
  a connection interface enabling connection with a computer; and
  a persistent memory storing modules, which are configured, upon connection of the user trusted device with the computer via the connection interface, to:
    enable the computer to start booting from the user trusted device;

instruct a processor of the computer to execute virtualization sensitive code and issue completion data upon completion of execution, which completion data depends on the virtualization sensitive code and its execution by the processor and wherein the virtualization sensitive code comprises instructions to switch the processor between a protected mode and a real mode;

determine, based on the completion data, whether the execution was not performed in a virtualized environment; and enable the computer to complete booting from the user trusted device upon determining that the execution was not performed in a virtualized environment.

2. The user trusted device of claim 1, further wherein the computer further comprises initialization firmware that is configured, upon connection of the user trusted device with the computer, to:

enable the computer to start booting from the user trusted device; and initiate a transfer of a processor instruction module onto the computer for subsequent execution at the computer, to cause the processor to execute the virtualization sensitive code and issue the completion data upon completion of execution.

3. The user trusted device of claim 1, wherein determining whether the execution was not performed in a virtualized environment comprises executing a verification module at the user trusted device and/or at the computer, and wherein executing the verification module comprises connecting to a server for at least partly determining at the server whether the execution was not performed in a virtualized environment.

4. The user trusted device of claim 1, wherein the processor is further instructed to produce as part of the completion data a list of one or more features supported by the computer.

5. The user-trusted device of claim 1, wherein the processor is further instructed to produce, as part of the completion data, a final state value dependent on a computational effort of the processor that was needed for executing the virtualization sensitive code.

* * * * *